(12) United States Patent
Ratzlaff et al.

(10) Patent No.: US 8,422,643 B2
(45) Date of Patent: Apr. 16, 2013

(54) PLAYBACK OF MEDIA RECORDINGS

(75) Inventors: Cordell Ratzlaff, Palo Alto, CA (US);
Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 12/608,503

(22) Filed: Oct. 29, 2009

(65) Prior Publication Data
US 2011/0103560 A1 May 5, 2011

(51) Int. Cl.
*H04M 11/00* (2006.01)
*G06F 3/00* (2006.01)

(52) U.S. Cl.
USPC .................................. 379/88.13; 715/716

(58) Field of Classification Search .... 379/88.11–88.25; 715/716, 723, 798; 348/211.99
See application file for complete search history.

(56) References Cited

U.S. PATENT DOCUMENTS

| | | | |
|---|---|---|---|
| 958,985 A | 5/1910 | Walstrom | |
| 6,262,724 B1 * | 7/2001 | Crow et al. | 715/723 |
| 6,538,665 B2 * | 3/2003 | Crow et al. | 715/723 |
| 6,850,256 B2 * | 2/2005 | Crow et al. | 715/798 |
| 6,922,816 B1 | 7/2005 | Amin et al. | |
| 7,111,240 B2 * | 9/2006 | Crow et al. | 715/723 |
| 7,222,308 B2 | 5/2007 | Sauermann et al. | |
| 7,315,984 B2 * | 1/2008 | Crow et al. | 715/716 |
| 7,318,196 B2 * | 1/2008 | Crow et al. | 715/716 |
| 7,458,025 B2 * | 11/2008 | Crow et al. | 715/723 |
| 7,917,784 B2 * | 3/2011 | de Cesare et al. | 713/320 |
| 2002/0057287 A1 * | 5/2002 | Crow et al. | 345/716 |
| 2003/0080991 A1 * | 5/2003 | Crow et al. | 345/716 |
| 2003/0128227 A1 * | 7/2003 | Crow et al. | 345/700 |
| 2003/0128228 A1 * | 7/2003 | Crow et al. | 345/716 |
| 2003/0146927 A1 * | 8/2003 | Crow et al. | 345/716 |
| 2007/0011614 A1 * | 1/2007 | Crow et al. | 715/723 |
| 2007/0013609 A1 * | 1/2007 | Crow et al. | 345/1.1 |
| 2008/0072152 A1 * | 3/2008 | Crow et al. | 715/716 |
| 2008/0077583 A1 * | 3/2008 | Castro et al. | 707/5 |
| 2008/0168285 A1 * | 7/2008 | de Cesare et al. | 713/320 |
| 2008/0170130 A1 * | 7/2008 | Ollila et al. | 348/211.99 |
| 2008/0313541 A1 * | 12/2008 | Shafton et al. | 715/725 |
| 2009/0220206 A1 * | 9/2009 | Kisliakov | 386/52 |
| 2011/0072078 A1 * | 3/2011 | Chai et al. | 709/203 |

OTHER PUBLICATIONS

*Fitts's Law*, http://en.wikipedia.org/wiki/Fitts's_law, Internet article printed on Jan. 23, 2010, 6 pages.
*Configuring Mouse Acceleration*, http://osr507doc.sco.com/en/GECG/X_Mouse_ProcAcclConfig.html, Internet article printed Jan. 29, 2010, 3 pages.

* cited by examiner

*Primary Examiner* — Mohammad Islam
(74) *Attorney, Agent, or Firm* — Brinks, Hofer, Gilson & Lione

(57) ABSTRACT

A media system is provided. The media system may include a media player, an input, and a processor. The media player may have a scrub bar and a playhead. The scrub bar may be operable to represent a time line of a media recording that is being played back and the playhead may indicate a portion of the media recording that is being played back. The input may be operable to receive user behavior. The processor may be operable to dynamically adjust a speed of playback of the media recording based on the user behavior.

14 Claims, 5 Drawing Sheets

PLAYBACK OF MEDIA RECORDINGS

FIELD

The present embodiments relate to playback of media recordings. In particular, the present embodiments relate to dynamically increasing or decreasing the speed of playback of media recordings.

BACKGROUND

Media devices, such as cellular telephones and video playback devices, may utilize media players for playing media recordings. The media player may have a scrub bar and playhead. The scrub bar may be a timeline of the recorded media being played back. One end of the scrub bar may represent the beginning of the recorded media and the other end of the scrub bar may represent the end of the recorded media. The playhead may be used to illustrate the portion of the recorded media currently being played back. The playhead may be selected and moved forwards and backwards along the scrub bar. When the playhead is released, the media may begin playing at that point of the media recording.

DETAILED DESCRIPTION

Figure 1:
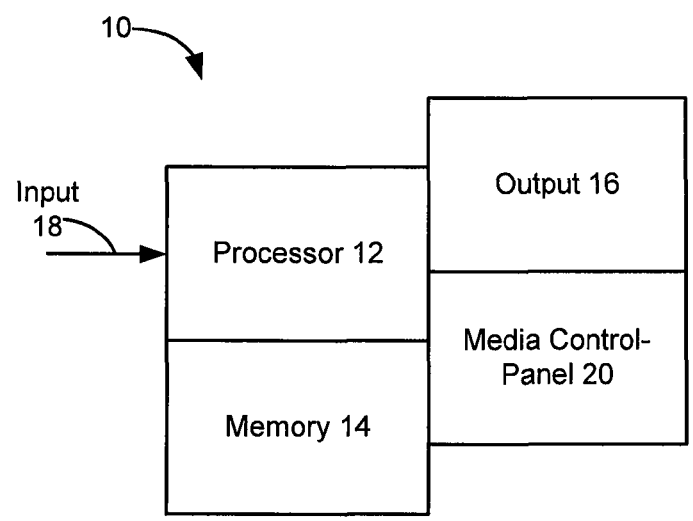
FIG. 1 illustrates one embodiment of a media device.

The present embodiments relate to playing (outputting) media recordings. Media recordings may include audio, video, and/or graphical recordings, such as voice messages, musical recordings, movie recordings, music videos, cartoon video, or other combinations of audio, video, and/or graphical recordings. Accordingly, playing the media recording may include producing audio, video, and/or graphics from a recording. The speed (i.e., rate) of producing the recording, which may be referred to as playback, may be dynamically increased or decreased using a substantially continuous function of user behavior. The continuous function allows the speed of playing the media to be adjusted without lock-step thresholds. In other words, adjusting the speed of play may be continuously adjusted as user input changes. The user input does not need to satisfy a threshold before speed is adjusted.

For example, in one embodiment, the speed may be increased as a user accelerates a media playhead along a scrub bar, or may be decreased as the user de-accelerates the media playhead along the scrub bar. Adjusting the speed as a function of acceleration allows the speed of playback to be dynamically adjusted based on human movement.

The present embodiments may utilize Fitts's law. Fitts's law is a model of human movement that predicts the time required to acquire a target area. The prediction is determined as a function of the distance to the target area and the size of the target area. Fitt's law predicts that the further an object is from a target area, the faster the object will be moved toward the object. However, as the object approaches the target area, the object will be slowed down to acquire the target without overshooting the target area. This characteristic of human movement may be used to control of the dynamic adjustment.

The present embodiments include systems and methods related to playing media recordings.

In one aspect, a media system is provided. The media system may include a media player, an input, and a processor. The media player displays a scrub bar and a playhead. The scrub bar represents a time line of a media recording that is being played and the playhead indicates a portion of the media recording that is being played. The input is operable to receive user behavior. The processor is operable to dynamically adjust a speed of playback of the media recording using a continuous function of user behavior.

In a second aspect, a method for adjusting a speed of playback of a media recording. The method receiving user input; determining a magnitude that represents the user input; and dynamically adjusting a speed of playback for a media based on the magnitude. The method may further include receiving additional user input and changing the magnitude each time the user input changes.

In a third aspect, logic encoded in one or more tangible media for execution is provided. The logic is executable to detect user behavior and dynamically adjust a speed of playback for a media recording using a continuous function. The speed of playback is changed continuously as user behavior changes.

In one illustration, which will be referred to herein as "the illustration above," Sarah owns and operates a cellular telephone that has a visual voicemail player. Voice mail messages may be stored and played using the visual voicemail player, which includes a scrub bar and a playhead. John leaves Sarah a voice mail message. The voice mail message includes an introduction (e.g., "Hello, my name is John."), a brief description of the reason for the phone call (e.g., "I would like to invite you to a meeting. The meeting will be held in conference room A at 8:30 am. At the meeting, we will discuss . . . ") a call back number (e.g., "You can reach me at 123-456-7890."), and a closing statement (e.g., "Have a good day. Goodbye."). Sarah may listen to the voice mail message when driving in the car, unable to write down John's phone number. Sarah may return to the voice mail message, in order to retrieve the phone number, when she arrives at home.

The present embodiments relate to decreasing the amount of time that it takes Sarah to acquire the phone number. The amount of time is decreased by allowing Sarah to dynamically increase the speed of playback during the introduction and description of the reason for the phone call. The introduction and description may be played back at, for example, 2×-10× the normal speed. Sarah may reduce the speed of playback, for example, to a normal or slower than normal rate, during the phone number portion of the voice mail message in order to capture the entire phone number without listening to the message more than once. In one embodiment, the speed of playback may be adjusted (e.g., increased or decreased) based on Sarah's behavior, such as accelerating the playhead along the scrub bar. Sarah may optionally listen to the closing statement or stop listening to the voice mail message. Sarah may optionally jump to or start the playing of the message at a selected time other than the beginning.

FIG. 1 illustrates a media system 10. The media system 10 may include a processor 12, memory 14, input 16, output 18, and media player 20. Additional, different, or fewer components may be provided. The processor 12 may be coupled with the memory 14, input 16, output 18, and/or media player 20. As used herein, the term "coupled with" includes directly or indirectly connected through one or more intermediary components. The one or more intermediary components may be hardware and/or software components or modules.

The media system 10 may be a media playback system configured to play media recordings. Exemplary media systems 10 include personal computers, cellular telephones, thin clients, Internet Protocol Television devices, voice-message players, media players, video playback devices, digital versatile disc (DVD) player, personal music players, radio players, or other devices for controlling playback of media recordings. In one embodiment, the media system 10 is an iPhone® sold by Apple Inc. having a corporate office in Cupertino, Calif. The iPhone® includes a visual voicemail player that allows users to play voice mail messages stored on the iPhone®. In another embodiment, the media system 10 is a personal computer or television configured to play video. The video may be stored on the personal computer or received from a remote device, such as a gateway, router, or server. The video may be received across the Internet.

As used herein, the term "user" may include the person or device operating the media system 10. The term "user" may include a human or electrical device programmed to operate the media system 10. In the illustration above, Sarah is the user and her cellular telephone is the media system 10.

The media system 10 may be operable to dynamically adjust a speed of playback of the media recording based on user behavior. As used herein, the term "user behavior" may include user input or interaction between a user and the media system 10, such as touching a screen, pressing a button, moving an object, or other interaction. User behavior is used to predict, estimate, calculate, or otherwise determine whether the user desires to increase the speed of playback or reduce the speed of playback. A user may increase speed of playback when they are further away from a target portion of the recording and may reduce speed of playback when they are closer to the target portion of the recording. For example, in the illustration above, once at home, Sarah may attempt to obtain (or acquire) John's phone number as fast as possible. Sarah may desire to quickly listen to the introduction and description in order to get to the phone number as quickly as possible. Sarah may increase the speed of playback for the voice mail message during the introduction and description. However, as Sarah approaches the phone number, the speed of playback may be reduced to a normal rate or a lower than normal rate to ensure that the phone number is correctly written down or stored. The adjustment of playback speed may be based on Sarah's interaction with the cellular telephone.

Dynamically adjusting the speed of playback is different than pressing a fast-forward or rewind button. Adjustment is based on continuous interaction with the media device instead of a threshold-based adjustment. Dynamic adjustment may allow the user to increase or decrease the speed or playback at any rate. Whereas, threshold-based adjustment only allows certain rates, such as 2, 4, or 8 times the normal rate. Dynamic adjustment may include using a continuous function that adapts to user interaction. The continuous function allows a user to converge on a target portion more quickly. The continuous function provides for more gradual adjustment than available based on only integers.

Dynamically adjusting the speed of playback may include offsetting frequency, so that the audio sounds normal. When the speed of media playback is adjusted, the resultant user experience may be degraded. For example, audio played back at higher speeds sounds higher-pitched. The media system 10 can compensate for this effect by dynamically adjusting the audio frequencies played, so that the resultant audio (played back at higher speed) matches the original audio frequencies. This adjustment is done dynamically since the amount of speedup is a continuous function. The continuous function allows the speed of playback to be adjusted without lock-step thresholds.

For video, for example, including images and audio, the adaptation is done by dynamically adjusting the video compression picture types. In the field of video compression, a video frame is compressed by compressing picture types or frame types. The three major picture types used in the different video algorithms are I, P and B. The I-frame may be an 'Intra-coded picture', in effect a fully-specified picture, like a conventional static image file. I-frames are the least compressible but don't require other video frames to decode. The P-frame ('Predicted picture') may hold only the changes in the image from the previous frame. For example, in a scene where a car moves across a stationary background, only the car's movements need to be encoded. The encoder does not need to store the unchanging background pixels in the P-frame, saving space. P-frames are also known as deltaframes. P-frames can use data from previous I-frames to decompress and are more compressible than I-frames. The B-frame ('Bi-predictive picture') saves even more space by using differences between the current frame and both the preceding and following frames to specify its content. B-frames can use both previous and forward frames for data reference to get the highest amount of data compression. P-frames and B-frames hold only part of the image information, so need less space to store than an I-frame, improving video compression rates.

In order to dynamically adjust the video compression picture types, the media system 10 may maintain the I-frames and drop P-frames and B-frames as the speedup increases. This preserves picture fidelity, even when the media stream is speeded up, since the P-frames and B-frames are incremental updates on top of I-frames. Rendering a P-frame without having rendered the corresponding I-frame earlier is likely to result in an incorrect image.

Increasing or decreasing the speed of playback may be different than skipping sections of the recordings. Increasing and decreasing the speed of playback allows a user to review the recording at an increased or decreased speed. Skipping sections of the recordings does not allow the user to review each portion of the recording. A DVD player may allow a user to skip sections of the recording by allowing the user to navigate through a series of tracks.

The processor 12 may be a general processor, digital signal processor, application specific integrated circuit, field programmable gate array, analog circuit, digital circuit, combinations thereof, or other now known or later developed processors. The processor 12 may be a single device or a combination of devices, such as associated with a network or distributed processing. Any of various processing strategies may be used, such as multi-processing, multi-tasking, parallel processing, remote processing, or the like. The processor 12 may be responsive to instructions stored as part of software, hardware, integrated circuits, firmware, micro-code or the like.

The memory 14 may be may be computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 14 may be a single device or a combination of devices. The memory 14 may be adjacent to, part of, networked with and/or remote from the processor 12. Logic encoded in one or more tangible media for execution is defined as the instructions that are executable by the programmed processor and that are provided on the computer-readable storage media, memories, or a combination thereof.

The memory 14 may be a computer readable storage media having stored therein data representing instructions executable by the programmed processor 12. The memory 14 may store instructions for the processor 12. The processor 12 may be programmed with and execute the instructions. The functions, acts, methods or tasks illustrated in the figures or described herein are performed by the programmed processor 12 executing the instructions stored in the memory 12. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The input 16 may be a user input, network interface, external storage, or other input device for providing data to the system 10. For example, the input 16 is a mouse, keyboard, track ball, touch screen, joystick, touch pad, buttons, knobs, sliders, combinations thereof, or other now known or later developed user input device. The user input may operate as part of a user interface. For example, one or more buttons may be displayed on a display. The user input is used to control a pointer for selection and activation of the functions associated with the buttons. Alternatively, hard coded or fixed buttons may be used. As another example, the input 16 is a hard-wired or wireless network interface. A universal asynchronous receiver/transmitter (UART), a parallel digital interface, a software interface, Ethernet, or any combination of known or later developed software and hardware interfaces may be used. The network interface may be linked to various types of networks, including a local area network (LAN), a wide area network (WAN), an intranet, a virtual private network (VPN), and the Internet.

The output 18 may be a display, a speaker, other device for outputting media, or a combination thereof. Additional, different, or fewer components may be provided. For example, multiple displays and/or speakers may be provided.

The display may be cathode ray tube (CRT), monitor, flat panel, touch screen, a general display, liquid crystal display (LCD), projector, printer or other now known or later developed display device for outputting information. The display may be operable to display one or more images. For example, images, projections, or representations of a workspace or interface may be displayed. In another example, the display may display three-dimensional (3D) images or representations. The speaker may be a computer speaker, multimedia speaker, internal speaker, external speaker, amplifier, built-in speaker, integrated speaker, head-phone speaker, acoustical speaker, or other audio device for outputting audio. In one embodiment, the speaker is a cellular telephone speaker on a cellular telephone. The cellular telephone speaker may be the speaker for listening to a media recording during normal operation (e.g., when holding the phone close to the user's ear) and/or broadcasting the media recording (e.g., when the user selects the speaker function of the telephone).

The media player 20 may enable a user to control playback interactively. The media player 20 may include hardware components and/or software components. For example, the media player 20 may be controlled or manipulated using a television remote control, computer mouse, touch panel controller, or other hardware device for receiving user behavior.

In another example, the media player 20 may be a visual voicemail player, music player, video player, other player configured to play media or a combination of media.

In one embodiment, the processor 12 may display the media player 20 on the output 18 and output the media recording. For example, in one embodiment, the processor 12 may play an audio file on one or more speakers. The input 16 may be used to control the media player 20.

Figure 2:
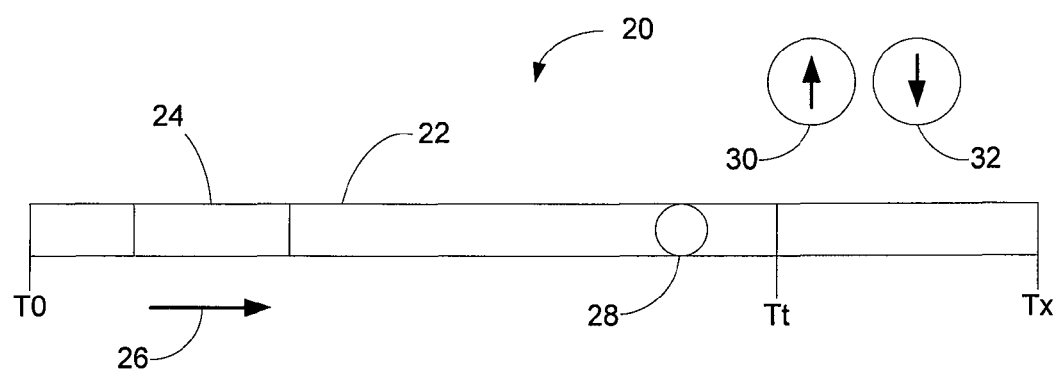
FIG. 2 illustrates one embodiment of a scrub bar.

FIG. 2 illustrates one embodiment of a media player 20. The media player 20 may include a scrub bar 22 and playhead 24. The media player 20 may include additional, different, or fewer components. For example, the media player 20 may include a set of buttons to start, stop, and pause the media stream and/or a slider to adjust the volume. Other components may be integrated in or used in conjunction with the media player component 20.

Other embodiments of the media player 20 may be used. For example, in one embodiment, the media player 20 may not include a playhead 24. Instead, the scrub bar 22 may be filled in as the media recording is played. The end of the filling may indicate the portion of the media currently being played.

The media player component 20 may be a media controller used to control playback of a media recording. The scrub bar may represent a time-line of the media recording. For example, as shown in FIG. 2, the beginning (T0) of the media recording may be represented on one end of the scrub bar 22 and the end (Tx) of the media recording may be represented on the other end of the scrub bar 22. The target portion (Tt) of the media recording may be disposed along the scrub bar 22. In addition to being disposed between the beginning (T0) and end (Tx) of the recording, the target portion (Tt) may be the beginning (T0) or end (Tx) of the recording. For example, the target portion (Tt) may be the end (Tx) of the recording. The user may desire to increase speed of playback throughout the entire recording. The location of the target portion (Tt) may be known or unknown.

The playhead 24 may indicate the portion of the media recording that is currently being played. For example, prior to playback, the playhead 24 may be located at the beginning (T0) of the media recording. During playback, the playhead 24 may be disposed along the scrub bar 22 to indicate the portion of the recording currently being played relative to the beginning (T0) and end (Tx) of the media recording. The scrub bar 22 may be a time line and the play head may represent the time of the portion being played. For example, half-way between the beginning (T0) and end (Tx) of the scrub bar 22 may indicate half-way through the media recording. After playback, the playhead 24 may be located or positioned at the end (Tx) of the scrub bar 22.

The media system 10 may be operable to dynamically adjust speed of playback based on user behavior. User behavior includes interaction between a user and the media system 10. Any interaction may be used to dynamically adjust the speed of playback. Exemplary embodiments of adjusting speed of playback based on user behavior are discussed below. As used herein, the term "based on" may include as a function of, according to, depending on, or as a result of.

In one exemplary embodiment, the media system 10 may adjust speed of playback based on acceleration 26, for example, of the playhead 24 along the scrub bar 22. In other words, as the user accelerates or decelerates the playhead 24, the speed of playback may be adjusted. As a result, the playhead's 24 velocity, with respect to time, is used to determine the speed of playback.

The media system 10 may determine the speed of playback, for example, using Equation 1.

$$\text{Speed of Playback (SoP)} = \Delta \text{playhead} * f(\Delta \text{playhead}) \quad \text{Equation 1}$$

The media system 10 uses a dynamic scaling function, $f(\Delta \text{playhead})$, which is based on the instantaneous acceleration of the mouse or other input. The media system 10 may determine the dynamic scaling function, for example, using Equation 2.

$$f(\Delta \text{playhead}) = \{k^*(dv/dt) \quad \text{Equation 2}$$

In Equation 2, "k" is a constant multiplier and $dv/dt$ is a derivative of the playhead's velocity with respect to time. Accordingly, the speed of playback is based on the movement acceleration of the playhead 24, which takes into account both the change in distance of the playhead and time, and varies dynamically. Accordingly, speed of playback may be adjusted as a function of change in distance of the playhead and time.

One benefit of determining the speed of playback based on acceleration is that the speed of playback is not limited to adjusting the speed of playback at various thresholds, such as time, distance, or activation thresholds. One problem with using threshold algorithms is that changing the speed of playback is choppy. However, dynamically adjusting the speed of playback based on acceleration of the playhead 24 provides the user a fluid way to adjust the speed of playback. In other words, the time, distance, or activation does not have to satisfy a threshold before changing the speed of playback. Rather, the speed of playback is adjusted as the acceleration changes.

In one embodiment, user behavior may be represented as a magnitude. For example, acceleration or velocity of a playhead may be represented as a magnitude that changes as acceleration or velocity changes. The magnitude may be a value that may be compared to other values. The magnitude may be associated with or correspond to a speed of playback. Each time the user changes the acceleration or velocity, the magnitude may change. The speed of playback may be changed based on the magnitude. The user behavior may be received as user input. Additional user input may be received. The magnitude may change each time user input changes.

Accordingly, the granularity of the playhead 24 may be adjusted to enable a user to more precisely select the desired point in the media. As used herein, granularity may be the extent to which speed of playback is broken down into small parts. For example, as the playhead 24 accelerates, granularity of the playhead 24 may be reduced as the speed of playback increases and increased as the speed of playback is decreased. The further away a target is, the longer it takes to acquire. Users tend to automatically compensate for the longer acquisition time by speeding up the movement of their pointing device. Similarly, closer targets take longer to acquire as users must slow down their movement, or hone in as they get closer to the target. This may occur as a subconscious process of the user. As a result, the present embodiments may utilize the user's subconscious or conscious behavior according to Fitt's law.

For example, a user may move the slider faster when they need to get to a point in the media that is further away. Accordingly, playhead 24 granularity becomes less granular and responds faster when the playhead 24 is moved faster. As movement of the playhead 24 slows, the granularity of the slider increases to enable a user to more precisely select the desired point in the media. Each increment of slider movement results in a corresponding smaller movement in the media.

Figure 3A:
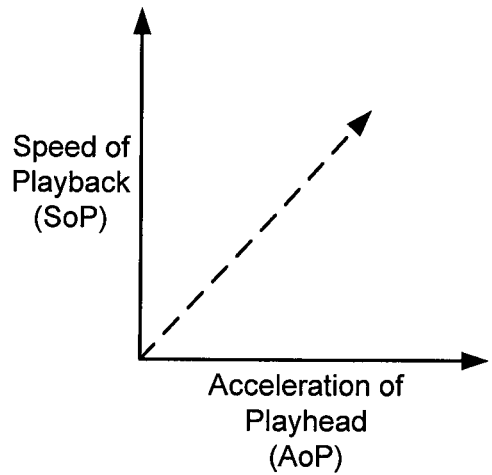
FIGS. 3A, 3B, and 3C illustrate different embodiments of dynamically increasing or decreasing the speed of playback of media recordings.

As shown in FIG. 3A, the speed of playback may be dynamically adjusted as a function of the acceleration of the playhead. The speed of playback may be increased or decreased. The greater the acceleration of the playhead, the faster the speed of playback.

Figure 3B:
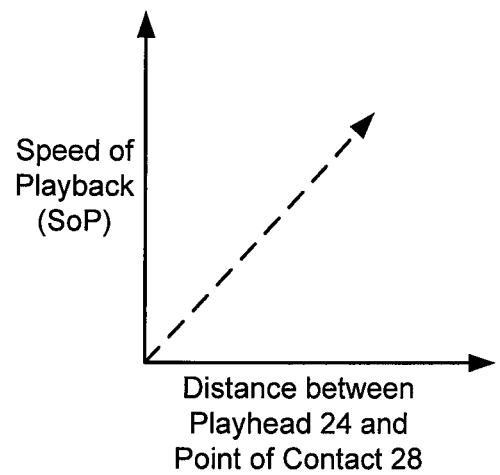

In another embodiment, the media system 10 may adjust a speed of playback of a media recording based on a distance from a point of contact 28 to the playhead 24 on the scrub bar 22. The point of contact 28 may be determined when the user taps a touch screen, for example, using a finger or stylus. The further the point of contact 28 is from the playhead 24, the faster the speed of playback may be increased. Other distances and speeds may be used for adjusting the speed of playback. For example, as shown in FIG. 3B, the speed of playback may be increased or decreased as a function of a distance from a point of contact 28 to the playhead 24 on the scrub bar 22. The closer the playhead becomes to the point of contact, the slower the speed of playback.

Figure 3C:
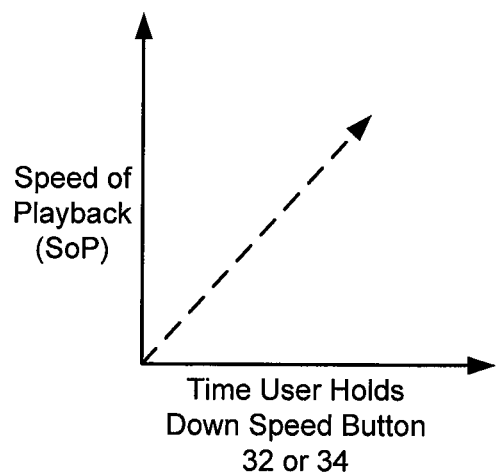

In yet another embodiment, the media system 10 may adjust speed of playback based on length of time. For example, the speed of playback may be adjusted as a function of time. As the increase speed button 30 or decrease speed button 32 is held down by the user, the speed of playback may be continuously adjusted. For example, as shown in FIG. 3C, the speed of playback may be increased or decreased as a function of the time the speed buttons 30 or 32 are held down. The longer the button 30 or 32 is held down, the faster the speed of playback. In an alternative embodiment, the longer the button 30 or 32 is held down, the slower the speed of playback.

The speed of playback may be continuously or periodically adjusted.

All, some, or none of the media recording may be adjusted. In one embodiment the media system 10 may shut off or stop outputting a portion of the media and adjust the playback of another portion of the media. For example, playback of audio may be adjusted while the video is shut off.

Figure 4:
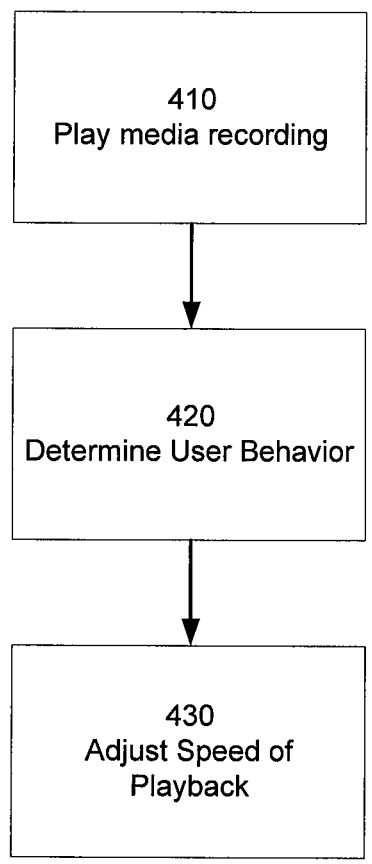
FIG. 4 illustrates one embodiment of a method for dynamically adjusting the speed of playback of media recordings.

FIG. 4 illustrates a method 400 for adjusting the speed of playback of media recordings. The method 400 may include playing media recording 410; determining user behavior 420; and adjusting speed of speed of playback based on user behavior 430. The acts may be performed in the order shown or a different order. For example, act 420 may be performed prior to act 410. Additional, different, or fewer acts may be provided.

In act 410, a media system may play a media recording. Playing the media recording may include playing audio, video, graphical images, text, or any combination thereof. The media recording may be played back using a media player, for example, including a scrub bar and playhead.

The media system may detect user behavior, as shown in act 420. User behavior may include a user's interaction with the media player playing a media recording. Detecting user behavior may include identifying when the user accelerates the playhead, taps on the scrub bar, holds down a button, or otherwise provides an indication that reflects a position of the playhead relative to the target portion of the media recording. Detecting user behavior includes calculating an acceleration of a playhead along a scrub bar and dynamically adjusting the speed of playback includes dynamically adjusting the speed of playback as a function of the acceleration. Detecting user behavior may include determining an interaction between a user and a media player that is operative to play the media recording.

In act 430, the media system may adjust a speed of playback based on the user behavior. Dynamically adjusting the speed of playback includes adjusting the speed of playback based on a distance from the playhead to a target portion of the media recording, the speed of playback being decreased as the playhead approaches the target portion. The speed of playback may be adjusted as a function of change in distance of a media player playhead along a scrub bar and time. Dynamically adjusting the speed of playback includes adjusting the speed of playback without lock-step thresholds. Dynamically adjusting the speed of playback may include increasing or decreasing the speed of playback by about 2×-10× a normal speed of playback.

Figure 5:
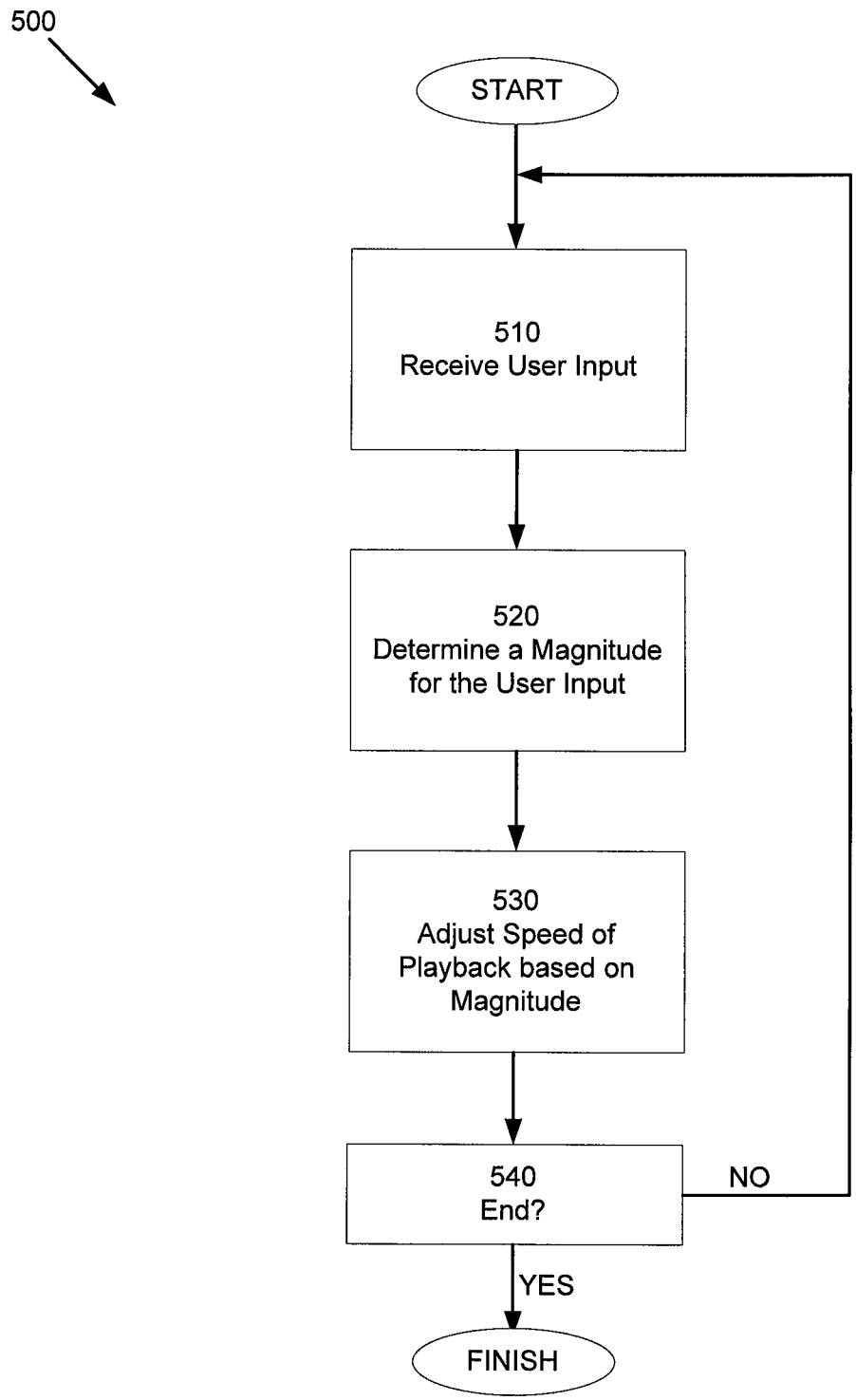
FIG. 5 illustrates another embodiment of a method for dynamically adjusting the speed of playback of media recordings.

FIG. 5 illustrates one embodiment of a method 500 for adjusting a speed of playback of a media recording. The method 500 may include receiving user input 510; determining a magnitude that represents the user input 520; and dynamically adjusting a speed of playback for a media based on the magnitude 530. Additional, different, or fewer acts may be provided. For example, act 540 may be included in the method.

In act 510, a media system may receive user input. User input may define user behavior, for example, moving a playhead along a scrub bar, holding down a button, or touching a pad. For example, in one embodiment, user behavior may define an acceleration of a playhead along a scrub bar. Additionally, as will be discussed below, receiving user input may include receiving additional user input, for example, on an ongoing basis. The additional user input may be different than user input. In act 520, a media system may determine a magnitude that represents user input. Determining the magnitude may include changing the magnitude each time user input changes. The magnitude may be updated each time user input is received, for example, on an ongoing basis. In act 530, a speed of playback for a media may be dynamically adjusted based on the magnitude. Accordingly, each time the magnitude is updated, the speed of playback may be adjusted. As a result, the speed of playback includes may be adjusted without lock-step thresholds. In act 540, the media system may determine whether the media recording is at the end of the recording. In other words, the media system may determine whether the entire media recording has been played. If so, shown as YES in FIG. 5, the media system may be finished receiving user input. However, if the media recording is not at the end, shown as NO in FIG. 5, the media system may receive additional user input and determine an updated magnitude and adjust speed of playback based on the updated magnitude.

Figure 6:
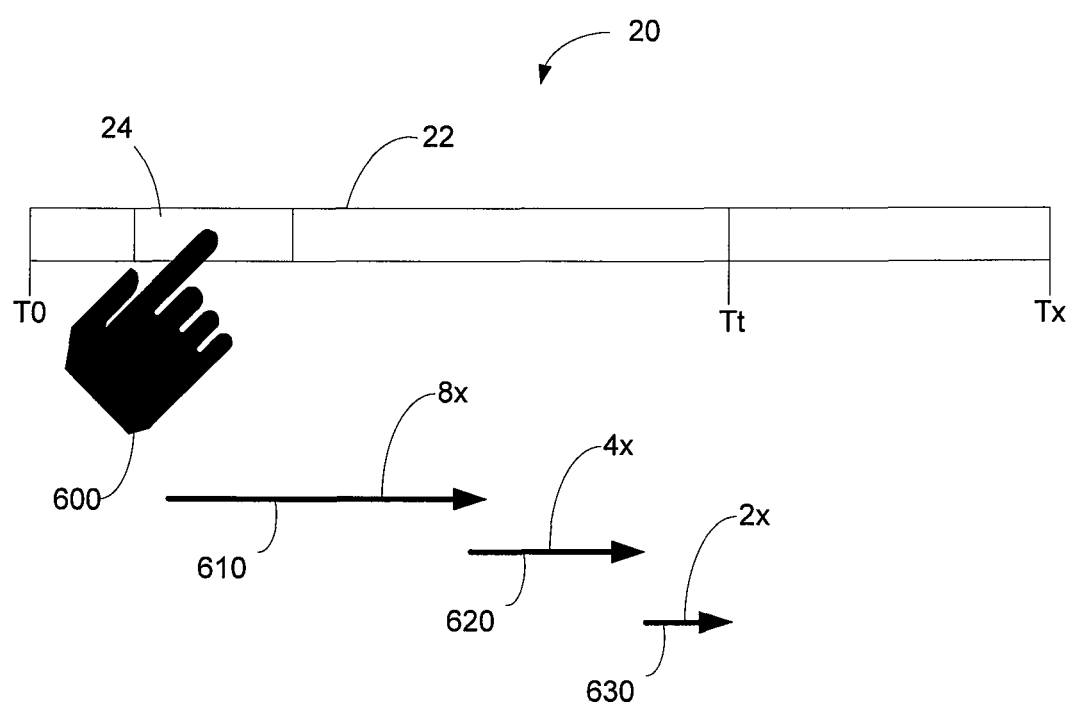
FIG. 6 illustrates one exemplary embodiment of a scrub bar.

FIG. 6 illustrates one exemplary embodiment of a media player 20 including a scrub bar 22 and a playhead 24. The media player 20 may be used to listen to a voicemail message, music, or some other type of audio and/or video. The user 600, which may be a human or electronic device programmed to control the media player, may select the playhead 24. Selection may include pressing, holding, or both the playhead 24. The user 600 may accelerate 610 the playhead 24 toward a target portion of the media. Based on the acceleration 610, the speed of the media may be adjusted continuously, for example, without lock-step thresholds. The acceleration 610, 620, and 630 may be proportional to the speed of playing the media. For example, a one-to-one correlation may exists between the acceleration 610, 620, 630 and the speed. As the user 600 deaccelerates 620, 630 the playhead 24, the speed may be reduced. Although shown as having only three accelerations 610, 620, 630 and three speeds 8×, 4×, 2×, the media player 20 may continuously adjust the speed based on the acceleration. In the example of FIG. 6, the longer the arrow of acceleration 610, 620, 630, the greater the acceleration. In other words, acceleration 610 may be greater than acceleration 620 and 630. Other configurations may be used.

Various embodiments described herein can be used alone or in combination with one another. The detailed description has described only a few of the many possible implementations of the present invention. For this reason, this detailed description is intended by way of illustration, and not by way of limitation.

The invention claimed is:

1. A media system comprising:
a media player having a scrub bar and a playhead, the scrub bar operable to represent a time line of a media recording that is being played and the playhead indicating a portion of the media recording that is being played;
an input operable to receive a user input to move the playhead; and
a processor configured to:
dynamically adjust a speed of playback of the media recording as a continuous function of an acceleration or a deceleration of the playhead moving along the scrub bar in response to the user input, and
compensate for the dynamically adjusted speed of the playback of the media recording by:
dynamic adjustment of frequencies of a resultant audio of the playback according to the dynamically adjusted speed of the playback in response to the media recording comprising audio; and
dynamic adjustment of one or more video compression picture types of a resultant video of the playback according to the dynamically adjusted speed of the playback in response to the media recording comprises video,
wherein the speed of playback is adjusted without lock-step thresholds, and
wherein the dynamic adjustment of frequencies of the resultant audio of the playback comprises dynamic adjustment of frequencies of the resultant audio to match original frequencies of the audio, and
wherein each of the acceleration and the deceleration comprises a rate at which a velocity of the user input changes.

2. The media system of claim 1, wherein the speed of playback is adjusted continuously from ten times a predetermined speed of playback to two times the predetermined speed of playback, wherein the speed of the playback is adjusted continuously based on the continuous function of the acceleration or the deceleration.

3. The media system of claim 1, wherein the acceleration comprises an instantaneous acceleration, wherein the deceleration comprises an instantaneous deceleration, and wherein the continuous function is a dynamic scaling function, $f=k*dv/dt$, where $dv/dt$ is the instantaneous acceleration or the instantaneous deceleration of the playhead and comprises a derivative of the playhead with respect to time, and where k is a multiplier.

4. The media system of claim 1, wherein the continuous function includes a model of human movement that predicts an amount of time required to acquire a target.

5. The media system of claim 1, wherein the acceleration comprises an instantaneous acceleration and the deceleration comprises an instantaneous deceleration.

6. A method for adjusting a speed of playback of a media recording, the method comprising:
receiving a user input that represents a target position of a playhead along a scrub bar in a media player;
moving the playhead from a current position to the target position along the scrub bar;
dynamically determining an acceleration or a deceleration of the playhead as the playhead moves to the target position;

dynamically, adjusting, with a processor, a speed of playback for a media based on the dynamically determined acceleration or deceleration, as the playhead approaches the target position along the scrub bar;

determining whether the media comprises at least one of audio or video; and compensating for the dynamically adjusted speed of the playback of the media, wherein, in response to the media comprising audio, dynamically compensating for the dynamically adjusted speed of the playback comprises: dynamically adjusting frequencies of a resultant audio of the playback according to the dynamically adjusted speed of the playback, wherein, in response to the media comprising video, dynamically compensating for the dynamically adjusted speed of the playback comprises: dynamically adjusting one or more video compression picture types of a resultant video of the playback according to the dynamically adjusted speed of the playback, wherein dynamically adjusting frequencies of the resultant audio of the playback comprises dynamically adjusting frequencies of the resultant audio to match original frequencies of the audio, wherein dynamically adjusting the speed of playback comprises adjusting the speed of playback without lock-step thresholds, and wherein each of the acceleration and the deceleration comprises a rate at which a velocity of the user input changes.

7. The method of claim 6, wherein the speed of playback continuously decreases from about ten times a normal speed of playback to about two times the normal speed of playback, wherein the speed of the playback is adjusted continuously based on the dynamically determined acceleration or deceleration of the playhead.

8. The method of claim 6, wherein the acceleration comprises an instantaneous acceleration, wherein the deceleration comprises an instantaneous deceleration, and wherein the speed of playback is adjusted according to a dynamic scaling function, $f=k*dv/dt$, where $dv/dt$ is the instantaneous acceleration or the instantaneous deceleration of the playhead and comprises a derivative of a velocity of the playhead with respect to time, and where k is a multiplier.

9. The method of claim 6, wherein the acceleration comprises an instantaneous acceleration and the deceleration comprises an instantaneous deceleration.

10. Logic encoded in one or more tangible media for execution and when executed operable to:

detect an input signal indicative of a user input including an acceleration or a deceleration of a playhead along a scrub bar;

dynamically adjust a speed of playback for a media recording using a continuous function, wherein the speed of playback is changed continuously as the acceleration or the deceleration of the user input changes; and compensate for the dynamically adjusted speed of the playback of the media recording by:

dynamic adjustment of frequencies of a resultant audio of the playback according to the dynamically adjusted speed of the playback in response to the media recording comprising audio; and dynamic adjustment of one or more video compression picture types of a resultant video of the playback according to the dynamically adjusted speed of the playback in response to the media recording comprising video, wherein each of the acceleration and the deceleration comprises a rate at which a velocity of the user input changes, wherein the logic is executable to adjust the speed of playback without lock-step thresholds, and wherein the dynamic adjustment of frequencies of the resultant audio of the playback comprises dynamic adjustment of frequencies of the resultant audio to match original frequencies of the audio.

11. The logic of claim 10, wherein the user input comprises a first user input, wherein the deceleration comprises an instantaneous deceleration, and wherein the logic is executable to:

detect a second user input indicating a position on the scrub bar; and dynamically detect the instantaneous deceleration of the playhead as the playhead approaches the position on the scrub bar;

adjust the speed of playback as a continuous function of the dynamically detected instantaneous deceleration, wherein the speed of playback decreases as the playhead approaches the position on the scrub bar indicated by the second user input.

12. The logic of claim 10, wherein the acceleration comprises an instantaneous acceleration and wherein the deceleration comprises an instantaneous deceleration, and wherein the continuous function includes $k*dv/dt$, where $dv/dt$ is the instantaneous acceleration or the instantaneous deceleration of the playhead and comprises a derivative of a velocity of the playhead with respect to time, and where k is a multiplier.

13. The logic of claim 10, wherein the continuous function includes a model of human movement that predicts an amount of time required to acquire a target.

14. The logic of claim 10, wherein the acceleration comprises an instantaneous acceleration and the deceleration comprises an instantaneous deceleration.

* * * * *